United States Patent
Ha et al.

(10) Patent No.: US 9,696,952 B2
(45) Date of Patent: Jul. 4, 2017

(54) METHOD OF PROVIDING SCREEN FOR MANIPULATING EXECUTION OF APPLICATION OF IMAGE FORMING APPARATUS AND IMAGE FORMING APPARATUS USING THE METHOD

(71) Applicant: Samsung Electronics Co., Ltd., Suwon-si, Gyeonggi-do (KR)

(72) Inventors: Kwang-soo Ha, Seoul (KR); Se-young Kim, Yongin-si (KR); Se-rrah Lim, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/644,592

(22) Filed: Mar. 11, 2015

(65) Prior Publication Data

US 2015/0347070 A1    Dec. 3, 2015

(30) Foreign Application Priority Data

Jun. 3, 2014   (KR) .................. 10-2014-0067796

(51) Int. Cl.
  *G06F 3/12*    (2006.01)
  *H04N 1/00*    (2006.01)
(52) U.S. Cl.
  CPC .......... *G06F 3/1258* (2013.01); *G06F 3/1203* (2013.01); *H04N 1/00411* (2013.01); *H04N 1/00413* (2013.01); *H04N 1/00472* (2013.01); *H04N 2201/0094* (2013.01)

(58) Field of Classification Search
  None
  See application file for complete search history.

(56) References Cited

U.S. PATENT DOCUMENTS

| | | | |
|---|---|---|---|
| 2005/0099400 A1* | 5/2005 | Lee ..................... | G06F 3/04883 345/173 |
| 2008/0176604 A1* | 7/2008 | Kim .................... | G06F 3/04886 455/566 |
| 2008/0304103 A1 | 12/2008 | Furutani | |
| 2011/0077083 A1* | 3/2011 | Ahn ....................... | A63F 13/10 463/37 |
| 2011/0279363 A1 | 11/2011 | Shoji et al. | |
| 2012/0242691 A1* | 9/2012 | Tanaka ............... | H04N 1/00411 345/629 |

(Continued)

FOREIGN PATENT DOCUMENTS

JP    2002-055750    2/2002

OTHER PUBLICATIONS

European Search Report dated Oct. 6, 2015 issued in corresponding European Patent Application 15170549.8.

*Primary Examiner* — Fan Zhang
(74) *Attorney, Agent, or Firm* — Staas & Halsey LLP

(57) ABSTRACT

A method of providing a screen for manipulating execution of an application of an image forming apparatus, and the image forming apparatus using the method. The method includes an operation of displaying, on the screen, a first user interface for setting options to be applied to the execution of the application, and a second user interface including at least one virtual button for controlling the operation of the image forming apparatus, so that a user may control the image forming apparatus without using physical buttons.

25 Claims, 9 Drawing Sheets

(56) References Cited

U.S. PATENT DOCUMENTS

| | | | |
|---|---|---|---|
| 2013/0227483 A1* | 8/2013 | Thorsander | G06F 3/0482 715/821 |
| 2013/0234948 A1 | 9/2013 | Jian | |
| 2014/0104178 A1* | 4/2014 | Jo | G06F 3/01 345/168 |
| 2015/0146226 A1* | 5/2015 | Ichiyama | H04N 1/00381 358/1.13 |

* cited by examiner

METHOD OF PROVIDING SCREEN FOR MANIPULATING EXECUTION OF APPLICATION OF IMAGE FORMING APPARATUS AND IMAGE FORMING APPARATUS USING THE METHOD

CROSS-REFERENCE TO RELATED APPLICATIONS

This application claims the benefit of Korean Patent Application No. 10-2014-0067796, filed on Jun. 3, 2014, in the Korean Intellectual Property Office, the disclosure of which is incorporated herein in its entirety by reference.

BACKGROUND

1. Field

One or more exemplary embodiments relate to a method of providing a screen for manipulating execution of an application of an image forming apparatus, and the image forming apparatus using the method.

2. Description of the Related Art

Various image forming apparatuses including a printer, a copy machine, a multi-functional device, etc. have a user interface by which a user may control an operation of the image forming apparatus or may input data to the image forming apparatus. A screen that provides the user interface is displayed on a manipulation panel of the image forming apparatus. According to developments in various technologies, hardware and software that are used in the image forming apparatus are also improved, and thus, the user interface of the image forming apparatus is being improved to increase user convenience.

SUMMARY

One or more exemplary embodiments include a method of providing a screen for manipulating execution of an application of an image forming apparatus, and the image forming apparatus using the method, whereby the image forming apparatus may be controlled by substituting a physical button for a virtual button.

Additional aspects will be set forth in part in the description which follows and, in part, will be apparent from the description, or may be learned by practice of the presented exemplary embodiments.

According to one or more exemplary embodiments, a method of providing a screen for manipulating execution of an application of an image forming apparatus includes operations of generating a first image signal indicating a first user interface for setting options to be applied to the execution of the application, and a second image signal indicating a second user interface including at least one virtual button for controlling an operation of the image forming apparatus; and displaying, based on the first image signal and the second image signal, the first user interface and the second user interface on the screen.

According to one or more exemplary embodiments, a non-transitory computer-readable recording medium includes a recorded program for executing the method by using a computer.

According to one or more exemplary embodiments, an image forming apparatus that provides a screen for manipulating execution of an application includes an image processor for generating a first image signal indicating a first user interface for setting options to be applied to the execution of the application, and a second image signal indicating a second user interface including at least one virtual button for controlling an operation of the image forming apparatus; and a display for displaying, based on the first image signal and the second image signal, the first user interface and the second user interface on the screen.

According to one or more exemplary embodiments, an image forming apparatus that provides a screen for manipulating execution of an application includes an image forming unit, an image processor to generate a first user interface for setting options to be applied to the execution of the application and a second user interface comprising first and second virtual buttons for controlling an operation of the image forming apparatus, and a display to display the first user interface and the second user interface on the screen. At least one of a function and an appearance of the first virtual button is maintained identical regardless of the application whose options are set by the first user interface while at least one of a function and an appearance of the second virtual button is changed according to the application whose options are set by the first user interface.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings. In this regard, the present exemplary embodiments should be considered in a descriptive sense only and not for purposes of limiting the scope of the inventive concept. All differences that can be easily derived, by one of ordinary skill in the art, from the descriptions and the exemplary embodiments, will be construed as being included in the scope of the inventive concept.

Throughout the specification, it will be further understood that the terms "configured", "configuring", "formed", and/or "forming" and "comprises", "comprising,", "includes" and/or "including", when used herein, specify the presence of stated components, steps, or operations, but do not preclude the absence of one or more of the components, steps, or operations or the addition of one or more other components, steps, or operations.

While such terms as "first," "second," etc., may be used to describe various components, such components must not be limited to the above terms. The above terms are used only to distinguish one component from another.

One or more exemplary embodiments are related to a method of providing a screen for manipulating execution of an application of an image forming apparatus, and the image forming apparatus using the method. In the following description, functions or constructions that are well-known to one of ordinary skill in the art will not be described in detail.

As used herein, the term "and/or" includes any and all combinations of one or more of the associated listed items.

Figure 1:
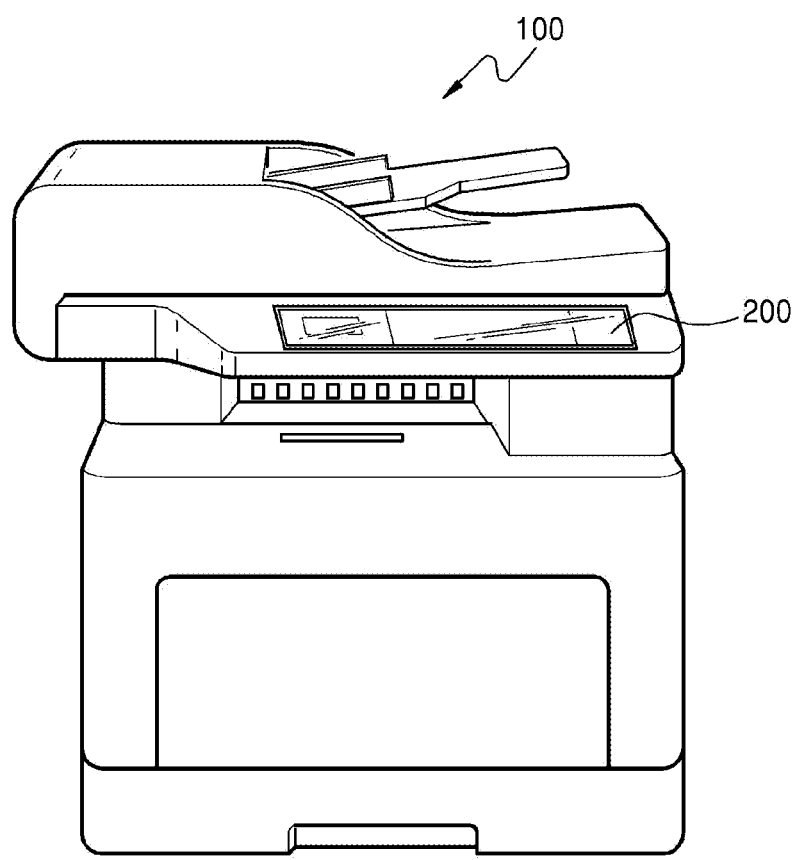
FIG. 1 illustrates an external appearance of an image forming apparatus.

FIG. 1 illustrates an external appearance of an image forming apparatus 100. The image forming apparatus 100 is an apparatus including a printer, a copy machine, or a multi-functional device capable of forming an image on a transfer medium such as paper.

The image forming apparatus 100 may have a user interface device arranged externally at a front portion, a side portion, or a rear portion of the image forming apparatus 100 so as to display information for controlling an operation of the image forming apparatus 100 and to receive an input of a user's manipulation. The user interface device may indicate both hardware and software that connect the image forming apparatus 100 with a user, and may be installed in the image forming apparatus 100. The user interface device may separately include a display for displaying information and a user input unit for receiving an input of the user's manipulation or may be configured such that a touchscreen in which the display and the user input unit are combined.

As illustrated in FIG. 1, the image forming apparatus 100 may provide a screen 200 at the front portion of the external appearance so as to manipulate an application of the image forming apparatus 100. The screen 200 for manipulating the execution of the application may be displayed on a display of the image forming apparatus 100. In order to operate a function of the image forming apparatus 100, a user may execute the application that corresponds to the function in the screen 200 for manipulating the application.

Figure 2:
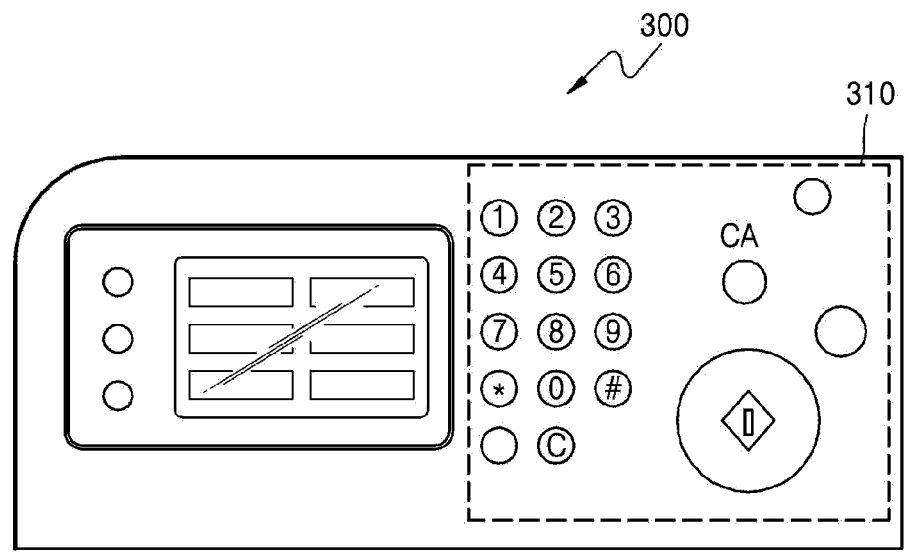
FIG. 2 illustrates physical button keys included in a manipulation panel of an image forming apparatus according to the related art.

FIG. 2 illustrates physical button keys included in a manipulation panel 300 of an image forming apparatus according to the related art.

Referring to FIG. 2, the manipulation panel 300 of the image forming apparatus according to the related art has a screen that displays information to a user so as to control the image forming apparatus, and a keypad 310 that is configured of the physical button keys as a user input unit for receiving an input of the user's manipulation. The keypad 310 that is configured of the physical button keys includes a 3×4 matrix numbers button part, a function button part, a control button part, a light-emitting diode (LED) for notifying a user about a status of the image forming apparatus, or the like. Here, the term "physical button" may refer to a button that protrudes from the manipulation panel and that has a tangible shape of its own such as a key on a computer keyboard, or a raised bubble key on a membrane-type keypad.

However, recently, a size of a manipulation panel mounted in the image forming apparatus 100 has increased, and in particular, a ratio has increased by which a display panel for displaying information to a user, a touch panel for receiving information from the user, or a touchscreen that combines the display panel and the touch panel occupies the overall manipulation panel.

When a size of the touch panel that is an integrated module of the display panel and the touch panel is increased, the user may specifically manipulate various functions that are executable in the image forming apparatus 100, so that user convenience with respect to the image forming apparatus 100 may be increased. Hereinafter, in one or more exemplary embodiments, physical keys that were provided in the related art as physical buttons of a manipulation panel of the image forming apparatus 100 are removed and, instead, the physical keys are generated as virtual buttons or icons by using software and are provided with the screen 200 for manipulating execution of an application. Accordingly, user convenience and usability of the image forming apparatus 100 may be highly improved. Hereinafter, a method of providing the screen 200 for manipulating execution of an application of the image forming apparatus 100, and the image forming apparatus 100 using the method are described.

Figure 3:
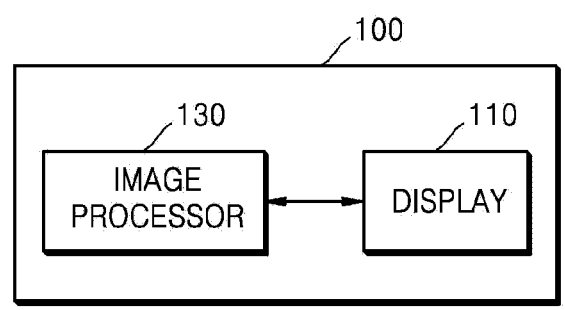
FIG. 3 is a block diagram illustrating a configuration of the image forming apparatus, according to an exemplary embodiment.

FIG. 3 is a block diagram illustrating a configuration of the image forming apparatus 100, according to an exemplary embodiment. It will be obvious to one of ordinary skill in the art that the image forming apparatus 100 may further include general-use elements as well as the elements shown in FIG. 3.

Referring to FIG. 3, the image forming apparatus 100 may include a display 110 and an image processor 130.

The display 110 may include a display panel (not shown) and a controller (not shown) for controlling the display panel. The display panel may be embodied as various displays including a liquid crystal display (LCD), an organic light-emitting diode (OLED) display, an active-matrix organic light-emitting diode (AM-OLED) display, a plasma display panel (PDP), or the like. The display 110 may be combined with a touch panel (not shown) and thus may be provided as a touchscreen (not shown). For example, the touchscreen may include an integrated module formed by stacking the display panel and the touch panel.

The image processor 130 may process an image signal for generating a screen to be displayed on the display 110. When a booting process of the image forming apparatus 100 is complete, the image processor 130 may generate a screen by processing an image signal so as to display a screen for controlling an operation of the image forming apparatus 100. In more detail, the image processor 130 may generate a screen including various objects such as various applications for executing functions of the image forming apparatus 100, various user interfaces for receiving an input of user's manipulation, various contents for providing information to a user. Examples of a user's manipulation may include touching a particular icon or virtual button with a finger or stylus. Different touches such as touches varying with time, location, or pressure may yield varying results. The image processor 130 may calculate attribute values such as coordinates values, forms, sizes, or colors by which the objects are displayed according to layouts of screens. Then, the image processor 130 may generate, based on the attribute values, the screens that have various layouts and include the objects.

The screens generated by the image processor 130 may be provided to the display 110 and may be displayed on an entire area or various predetermined areas making up a portion of the display 110.

Hereinafter, mutual connection between the display 110 and the image processor 130, and operations of the display 110 and the image processor 130 shown in FIG. 3 are described.

The image processor 130 may generate an image signal that indicates a first user interface for setting options to be applied to execution of an application, and a second user interface including at least one virtual button for controlling an operation of the image forming apparatus 100 so that the first and second user interfaces are generated.

The display 110 may display, based on the image signal generated by the image processor 130, the first user interface and the second user interface on the screen 200 for manipulating the execution of the application.

When the user's manipulation with respect to the screen 200 is input, the image processor 130 may perform image processing that corresponds to the user's manipulation and may control a new screen to be displayed on the display 110. Hereinafter, a configuration and operations of the screen 200 for manipulating execution of an application are 3 described in detail.

Figure 4:
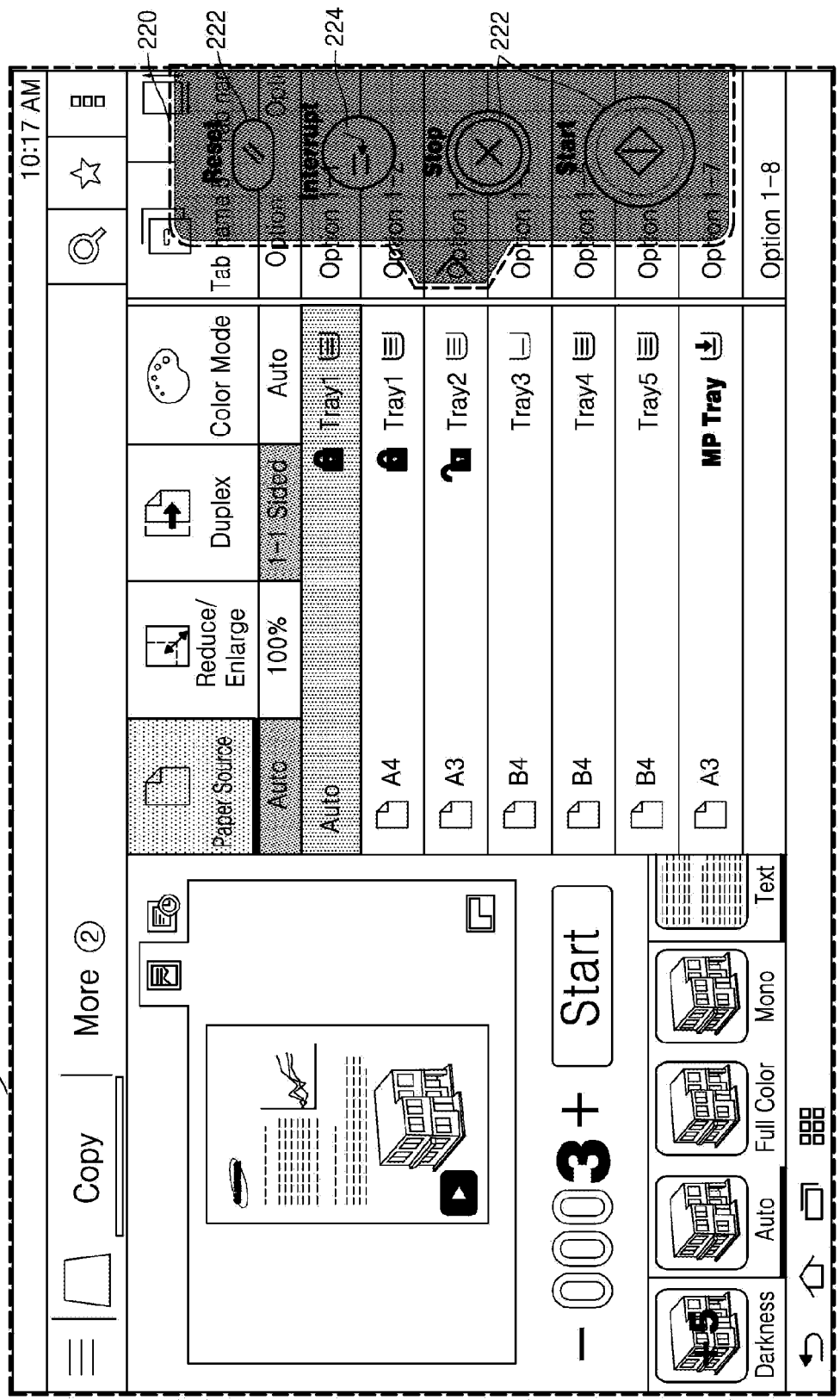
FIG. 4 illustrates a screen for manipulating execution of an application of the image forming apparatus, according to an exemplary embodiment.

FIG. 4 illustrates the screen 200 for manipulating execution of an application of the image forming apparatus 100, according to an exemplary embodiment. FIG. 4 illustrates the screen 200 for manipulating the execution of the application when a user selects a copy application from among a plurality of applications that are executable by the image forming apparatus 100.

Referring to FIG. 4, the screen 200 for manipulating the execution of the application may include a first user interface 210 for setting options to be applied to the execution of the application, and a second user interface 220 including at least one virtual button (here, virtual buttons 222 and 224) for controlling an operation of the image forming apparatus 100.

The first user interface 210 may set the options to be applied to the execution of the application. As illustrated in FIG. 4, when the copy application is executed, the first user interface 210 may set options related to a copy, e.g., the number of copied pages, image attribute adjustment, a paper source, reduction/enlargement, a duplex copy, a color mode, document alignment, etc.

The second user interface 220 may include the virtual buttons 222 and 224 for controlling the operation of the image forming apparatus 100. The virtual button 222 may be one of buttons for starting, stopping, and resetting the operation of the image forming apparatus 100. The second user interface 220 may also include the virtual button 224 whose shape and function are changed according to types of the application. For example, referring to FIGS. 4 and 5, respectively, button 224 is configured as an Interrupt function when the Copy application is being executed or is being displayed in first user interface 210 while button 224 is configured as an On Hook function when the Start application is being executed or is being displayed in first user interface 210. When the second user interface 220 includes the virtual buttons 222 and 224, the second user interface 220 may be separated based on each of the virtual buttons 222 and 224 and may be displayed.

The first user interface 210 and the second user interface 220 may occupy separate areas of the screen 200 without overlapping each other or may be displayed while overlapping each other. In order to utilize well an area of the screen 200 for manipulating the execution of the application, it is recommended that the first user interface 210 and the second user interface 220 are displayed while overlapping each other, and the second user interface 220 adaptively varies according to user's manipulation. Hereinafter, for convenience of description, it is assumed that the first user interface 210 and the second user interface 220 overlap each other on the screen 200 for manipulating the execution of the application.

When the first user interface 210 and the second user interface 220 overlap each other on the screen 200 for manipulating the execution of the application, the second user interface 220 may be displayed on or overlapping the first user interface 210. In other words, an area of the first user interface 210 that is overlapped by the second user interface 220 including the virtual buttons 222 and 224 may be obstructed by the second user interface 220. In this case, in order to minimize the obstruction due to the second user interface 220, a transparency of an entire area or a partial area of the second user interface 220 may be adjusted. For example, a degree of the transparency of the entire area or the partial area of the second user interface 220 may be greater than a degree of a transparency of the first user interface 210.

The first user interface 210 and the second user interface 220 may be displayed differently according to application types. Hereinafter, when a different application is executed, the screen 200 for manipulating execution of the different application is described.

Figure 5:
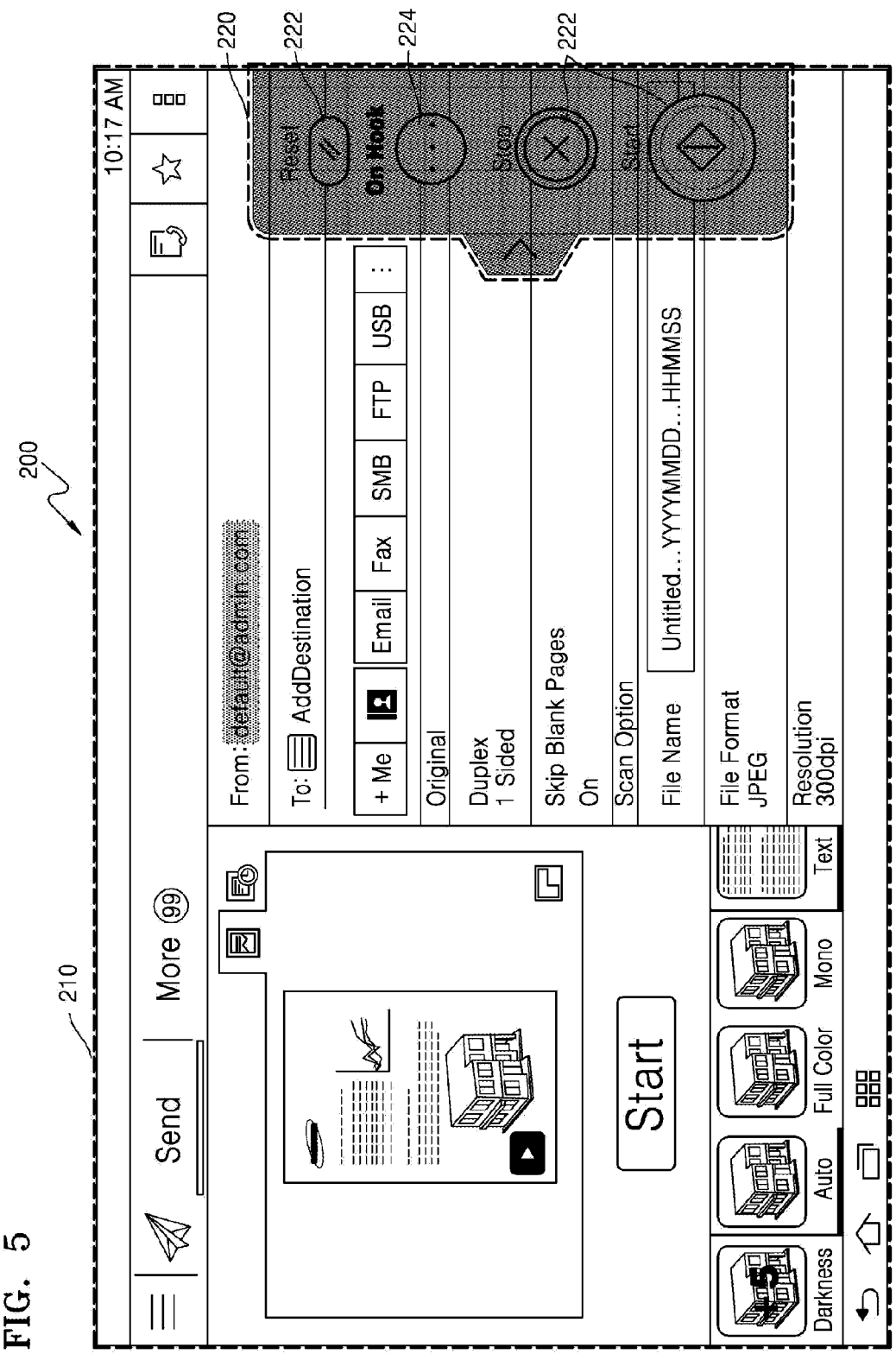
FIG. 5 illustrates the screen for manipulating execution of an application of the image forming apparatus, according to another exemplary embodiment.

FIG. 5 illustrates the screen 200 for manipulating execution of an application of the image forming apparatus 100, according to another exemplary embodiment. FIG. 5 illustrates the screen 200 for manipulating the execution of the application when a user selects a send application from among a plurality of applications that are executable by the image forming apparatus 100. The embodiment of FIG. 5 is described with reference to a difference from the embodiment of FIG. 4.

Referring to FIG. 5, the screen 200 for manipulating the execution of the application may include a first user interface 210 for setting options to be applied to the execution of the application, and a second user interface 220 including the virtual buttons 222 and 224 for controlling an operation of the image forming apparatus 100.

The first user interface 210 may set the options to be applied to the execution of the application. As illustrated in FIG. 5, when the send application is executed, the first user interface 210 may set options related to scanning and transmitting a document, e.g., the options related to adjusting an attribute of an image included in the document, setting a sender, setting a receiver, a method of transmitting the scanned document, scanning both sides, skipping a blank page, a file name of the scanned document, a file format of the scanned document, resolution of the scanned document, etc.

The second user interface 220 may include virtual buttons 222 and 224 for controlling the operation of the image forming apparatus 100. As in the embodiment of FIG. 4, the virtual button 222 may be one of buttons for starting, stopping, and resetting the operation of the image forming apparatus 100. However, unlike the embodiment of FIG. 4, when the send application is executed or when attributes corresponding to the send application are displayed on the first user interface 210, the second user interface 220 may include an On Hook button as the virtual button 224 whose shape and function are changed according to types of the application. In the embodiment of FIG. 4, when the copy application is executed, the virtual button 224 whose shape and function are changed according to types of the application is an Interrupt button.

Hereinafter, as in the embodiments of FIGS. 4 and 5, when the first user interface 210 and the second user interface 220 overlap each other on the screen 200 for manipulating execution of an application, changes in the screen 200 for manipulating the execution of the application is described, wherein the changes occur in response to an input of user's manipulation.

Figure 6:
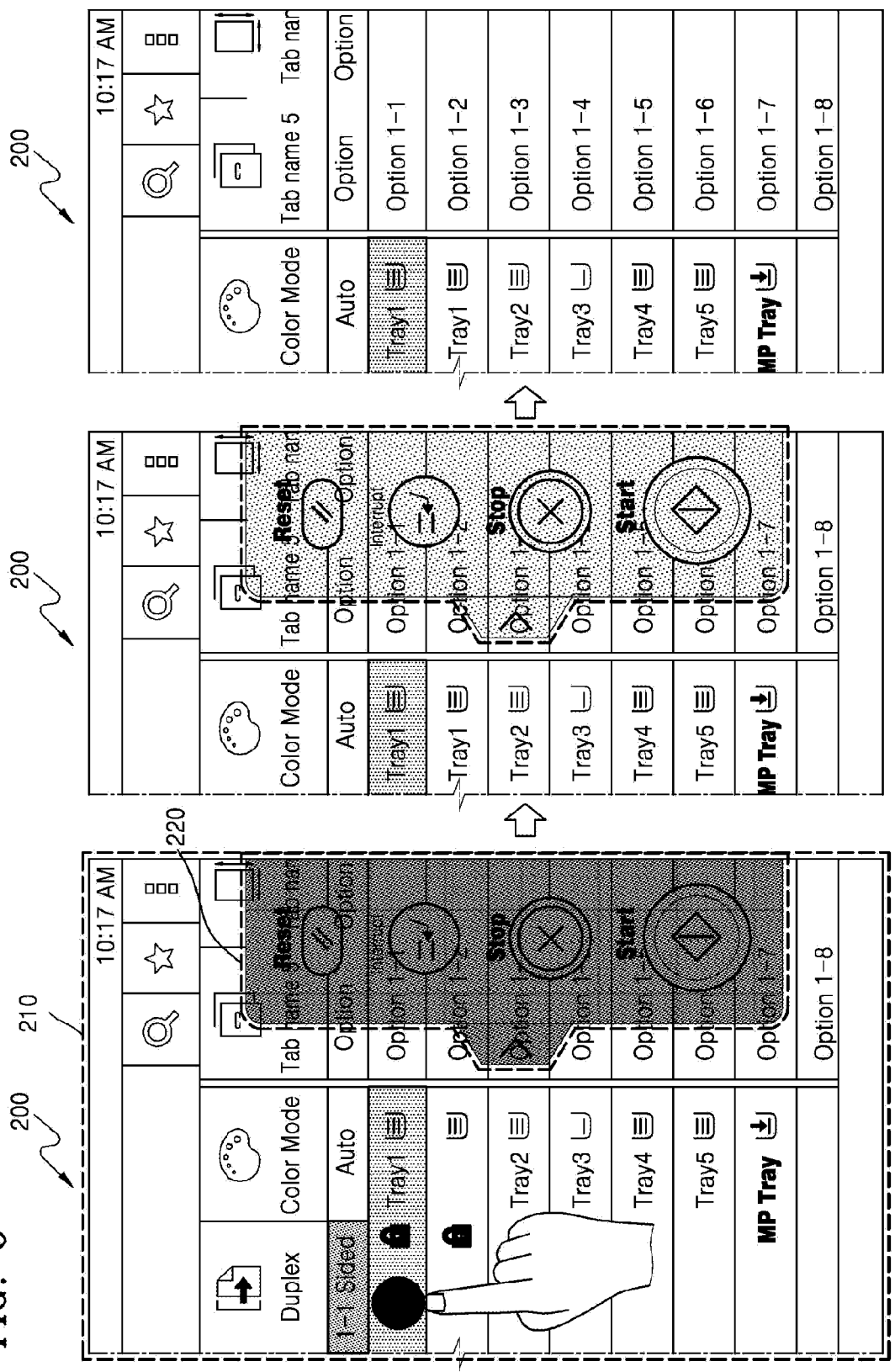
FIG. 6 illustrates changes in a second user interface which occur when a user's manipulation with respect to a first user interface is input to the screen for manipulating execution of an application of the image forming apparatus, according to an exemplary embodiment.

FIG. 6 illustrates changes in a second user interface 220 which occur when user's manipulation with respect to a first user interface 210 is input to the screen 200 for manipulating execution of an application of the image forming apparatus 100, according to an exemplary embodiment. Referring to FIG. 6, three diagrams are shown from the left, according to flow of time, and in particular, an area of the first user interface 210 that overlaps the second user interface 220 is mainly shown.

Referring to the first diagram, when the first user interface 210 and the second user interface 220 overlap each other on the screen 200 for manipulating the execution of the application, the second user interface 220 may be displayed on the first user interface 210. Thus, a user has no difficulty in pressing virtual buttons 222 and 224 and executing functions of the virtual buttons 222 and 224 that are included in the second user interface 220.0 However, an area of the first user interface 210 that is obstructed by the second user interface 220 is not apparent or clearly visible and thus is unable to receive an input of user's manipulation. Here, as shown in the first diagram, a user may input user's manipulation to a random area of the first user interface 210.

Referring to the second diagram, after the user's manipulation with respect to the first user interface 210 is input, the second user interface 220 becomes transparent.

Referring to the third diagram, the second user interface 220 completely disappears on the first user interface 210. Here, the user may previously set and adjust a time in which the second user interface 220 becomes transparent and then completely disappears.

As described above, when the user's manipulation with respect to the first user interface 210 is input, the second user interface 220 disappears during a predetermined time from the screen 200 for manipulating the execution of the application, so that the first user interface 210 may be in a usable state for the user.

If the user's manipulation is not input during the predetermined time, the display 110 of the image forming apparatus 100 may display again the second user interface 220 on the first user interface 210. Alternatively, if user's manipulation is input to request the display 110 to display the second user interface 220, the display 110 of the image forming apparatus 100 may display again the second user interface 220 on the first user interface 210. A procedure in which the disappeared second user interface 220 is displayed again on the screen 200 for manipulating the execution of the application may be in reverse order of the diagrams shown in FIG. 6.

Figure 7:
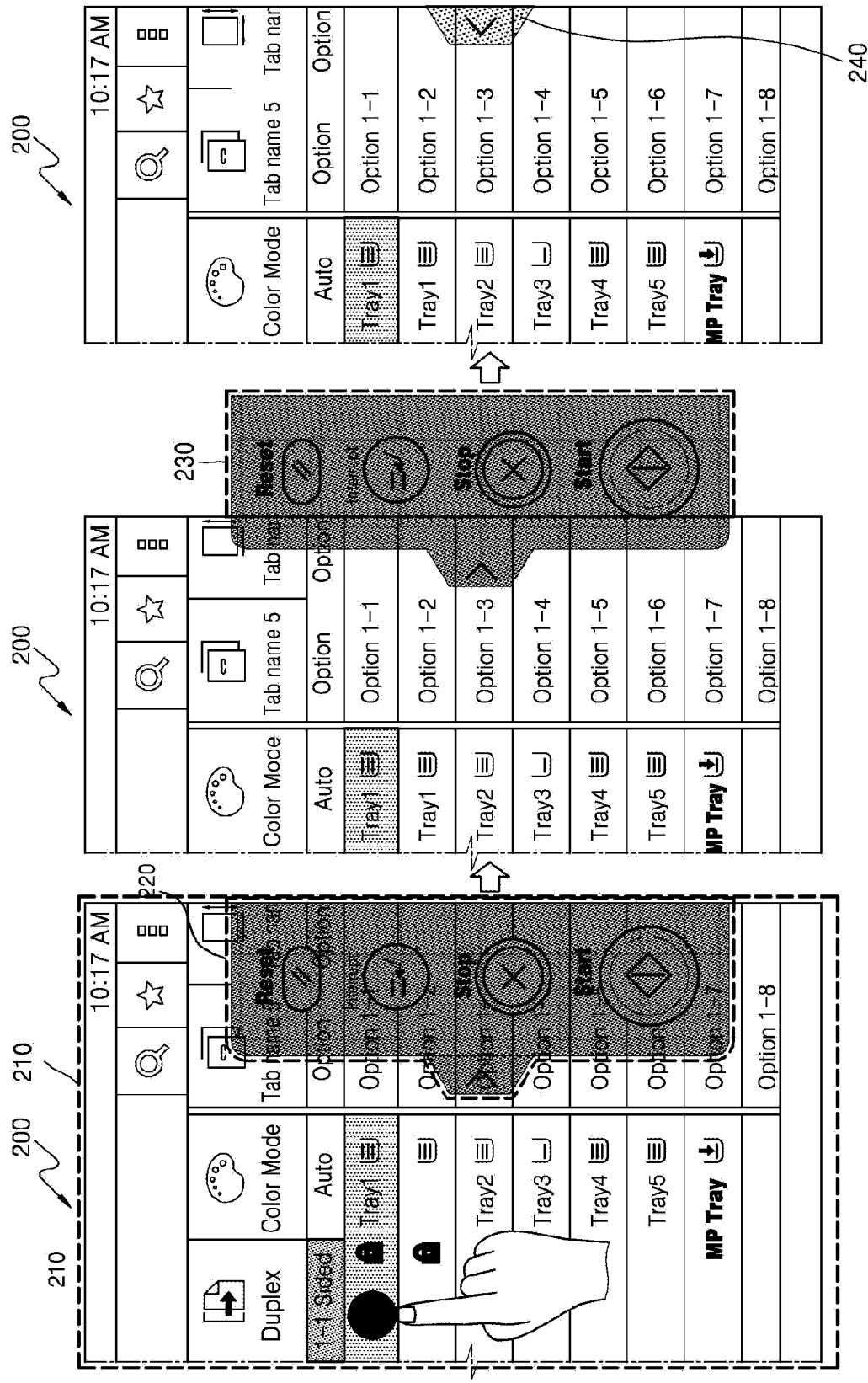
FIG. 7 illustrates changes in the second user interface which occur when the user's manipulation with respect to the first user interface is input to the screen for manipulating execution of an application of the image forming apparatus, according to another exemplary embodiment.

FIG. 7 illustrates changes in the second user interface 220 which occur when a user's manipulation with respect to the first user interface 210 is input to the screen 200 for manipulating execution of an application of the image forming apparatus 100, according to another exemplary embodiment. Referring to FIG. 7, three diagrams are shown from left to right, according to the flow of time, and in particular, an area of the first user interface 210 that overlaps the second user interface 220 is mainly shown.

Referring to the first diagram, when the first user interface 210 and the second user interface 220 overlap each other on the screen 200 for manipulating the execution of the application, the second user interface 220 may be displayed over the first user interface 210. As described above with respect to FIG. 6, an area of the first user interface 210 that is obstructed by the second user interface 220 is not apparent or clearly visible and thus is unable to receive an input of user's manipulation. Here, as shown in the first diagram, the user's manipulation may be input to arbitrarily input to any area of the first user interface 210.

Referring to the second diagram, after the user's manipulation with respect to the first user interface 210 is input, the second user interface 220 moves in a right direction. In this regard, the user may previously set and adjust a disappearance speed, a disappearance direction, or a disappearance position of the second user interface 220. In the second diagram, an area 230 of the second user interface 220 that has a dotted outline extends beyond the screen 200 for manipulating the execution of the application, and thus is not displayed on the screen 200 for manipulating the execution of the application.

Referring to the third diagram, the second user interface 220 may be displayed in the form of a substitution icon 240 on an area of the screen 200 for manipulating the execution of the application, so as to notify the user about the existence of the second user interface 220. The substitution icon 240 may be generated by deforming an area of the second user interface 220 or may be generated with a new form. Alternatively, as illustrated in FIG. 6, the second user interface 220 may completely disappear on the first user interface 210.

As described above, when the user's manipulation with respect to the first user interface 210 is input, the second user interface 220 is substituted or replaced with the substitution icon 240 having a small size or completely disappears for a predetermined time from the screen 200 for manipulating the execution of the application, so that the first user interface 210 may be in a usable state for the user. In an alternative embodiment, the second user interface 220 disappears until the user's manipulation with respect to the first user interface is no longer input.

If the user's manipulation is not input during the predetermined time, the display 110 of the image forming apparatus 100 may display again the second user interface 220 on the first user interface 210. Alternatively, if user's manipulation is input to request the display 110 to display the second user interface 220, e.g., if the user clicks the substitution icon 240, the display 110 of the image forming apparatus 100 may display again the second user interface 220 on the first user interface 210. A procedure in which the disappeared second user interface 220 is displayed again on the screen 200 for manipulating the execution of the application may be in reverse order of the diagrams shown in FIG. 7.

As described above with reference to FIGS. 6 and 7, in a case where the first user interface 210 and the second user interface 220 are displayed while overlapping each other and thus, it is difficult to use the first user interface 210, the second user interface 220 may disappear according to the user's manipulation, so that the user may use the first user interface 210.

Figure 8:
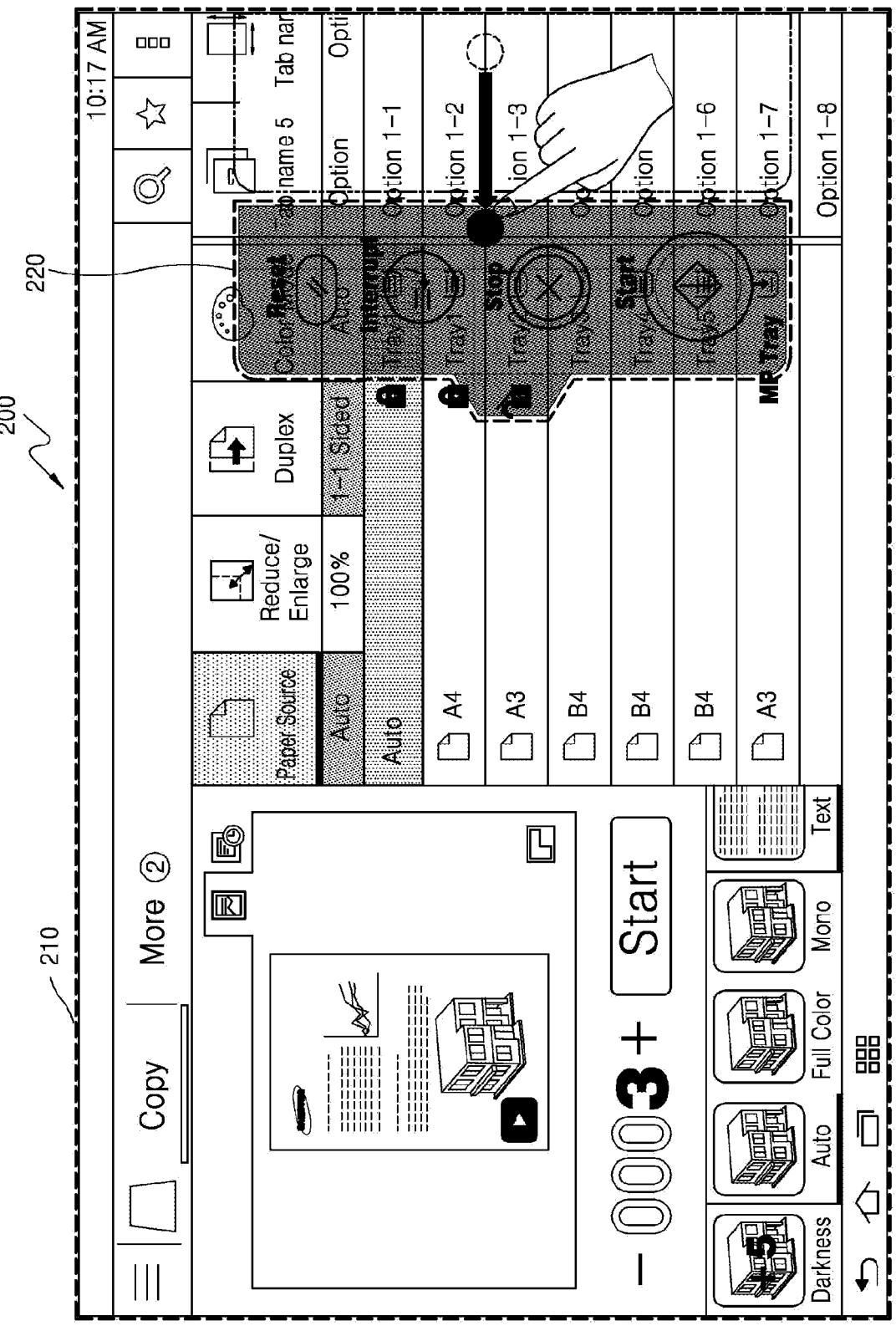
FIG. 8 illustrates that a position of the second user interface is moved on the screen for manipulating execution of an application of the image forming apparatus, according to an exemplary embodiment.

FIG. 8 illustrates that a position of the second user interface 220 is moved on the screen 200 for manipulating execution of an application of the image forming apparatus 100, according to an exemplary embodiment.

If the position of the second user interface 220 displayed on the screen 200 for manipulating the execution of the application obstructs a portion, required to be viewed, of the first user interface 210, it is necessary to change the position of the second user interface 220 that overlaps on the first user interface 210.

Referring to FIG. 8, the second user interface 220 that is displayed over the first user interface 210 and that obscures a portion of the first user interface 210 may be moved to an arbitrary or random position on the first user interface 210, according to user's manipulation.

For example, as illustrated in FIG. 8, if a user presses a portion of the second user interface 220 for few seconds at an original position of the second user interface 220, the second user interface 220 may be in a movable state for the user. Afterward, the user may move the second user interface 220 to a desired position in a drag-and-drop manner, so that the original position of the second user interface 220 may be changed. An alternative method of moving the original position of the second user interface 220 is described below with reference to FIG. 9.

Figure 9:
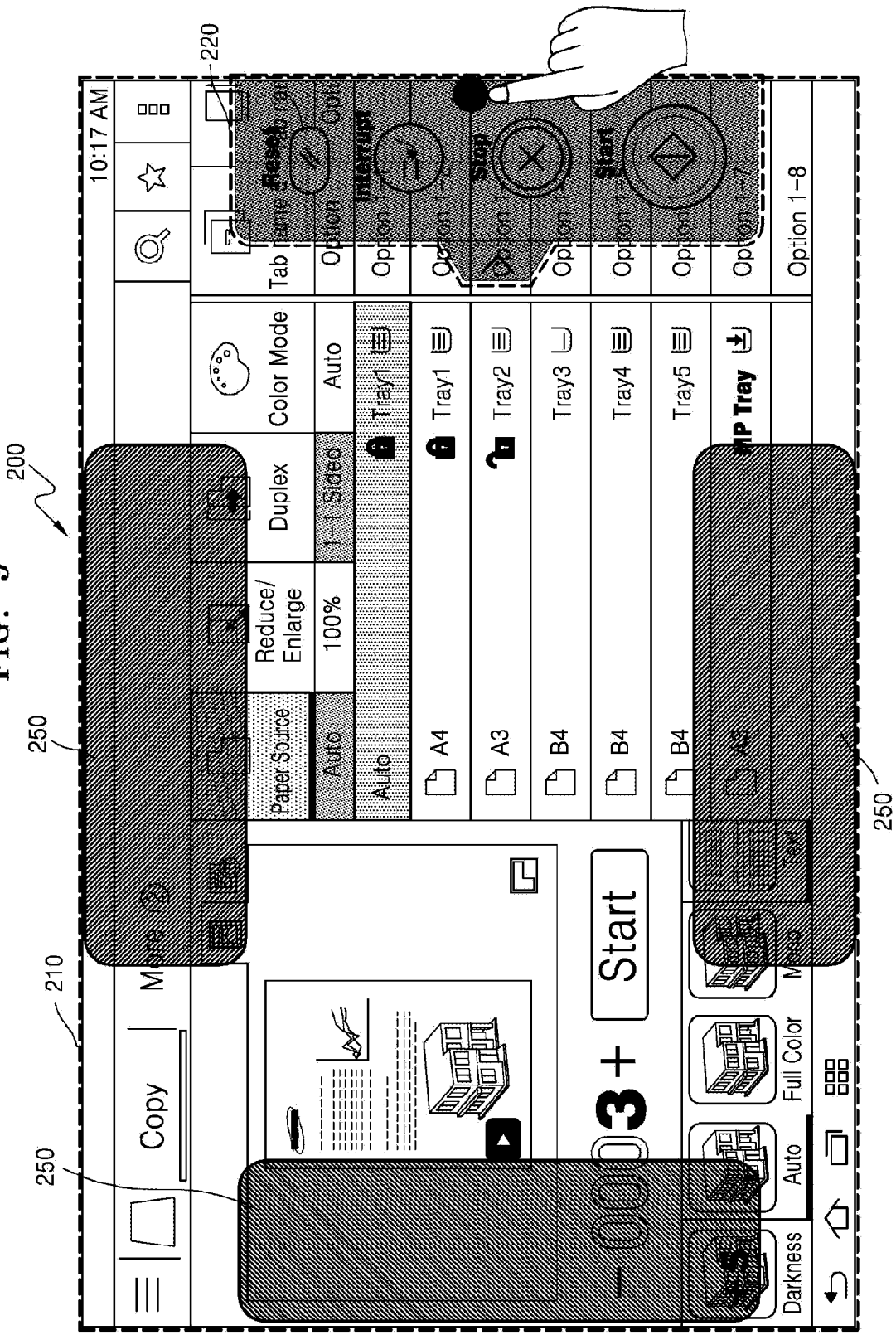
FIG. 9 illustrates that a position of the second user interface is moved on the screen for manipulating execution of an application of the image forming apparatus, according to another exemplary embodiment.

FIG. 9 illustrates that a position of the second user interface 220 is moved on the screen 200 for manipulating execution of an application of the image forming apparatus 100, according to another exemplary embodiment.

As illustrated in FIG. 9, if user's manipulation with respect to the second user interface 220 is input, the display 110 of the image forming apparatus 100 may display positions 250 to which the second user interface 220 may be moved on the screen 200 for manipulating the execution of the application. For example, if a user presses a portion of the second user interface 220 for few seconds, the display 110 may distinguishably display the positions 250 from other areas of the first user interface 210.

The display 110 of the image forming apparatus 100 may move and display the second user interface 220 at a user-selected position from among the positions 250 to which the second user interface 220 may be moved. For example, if the user selects one of the positions 250 to which the second user interface 220 may be moved, or drags and drops the second user interface 220 to a desired position, the display 110 of the image forming apparatus 100 may move and display the second user interface 220.

Figure 10:
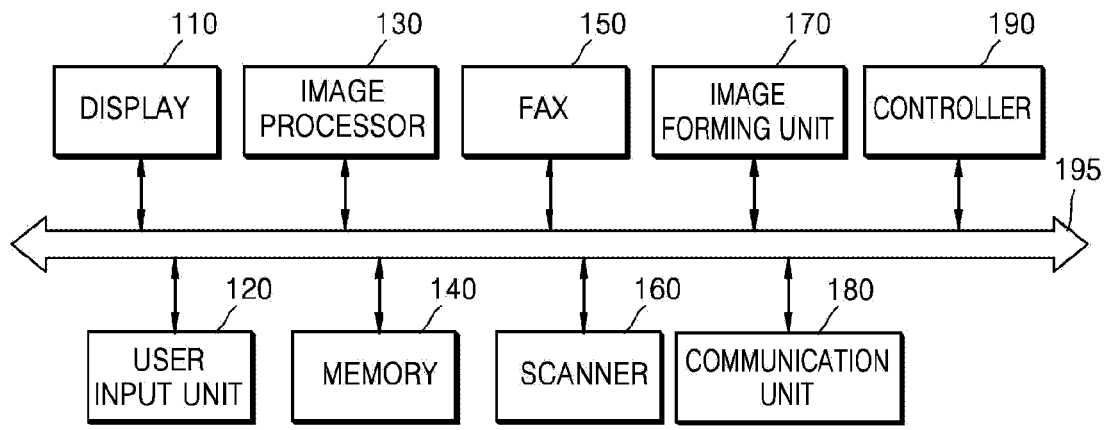
FIG. 10 is a block diagram illustrating a configuration of the image forming apparatus, according to another exemplary embodiment.

FIG. 10 is a block diagram illustrating a configuration of the image forming apparatus 100, according to another exemplary embodiment. It will be obvious to one of ordinary skill in the art that the image forming apparatus 100 may further include general-use elements as well as the elements shown in FIG. 10. Elements of the image forming apparatus 100 may be added, omitted, or integrated according to actual specification of the image forming apparatus 100. For example, if required, at least two elements from among the elements of the image forming apparatus 100 shown in FIG. 10 may be integrated into one element or one element from among the elements may be subdivided into at least two elements.

Referring to FIG. 10, the image forming apparatus 100 may include, for example, the display 110, a user input unit 120, the image processor 130, a memory 140, a fax 150, a scanner 160, an image forming unit 170, a communication unit 180, and a controller 190. The elements may exchange data with each other by using a data bus 195.

The display 110 may display, to a user, the screen 200 for manipulating execution of an application. The screen 200 for manipulating the execution of the application may include a first user interface 210 for setting options to be applied to the execution of the application, and a second user interface 220 including virtual buttons 222 and 224 for controlling an operation of the image forming apparatus 100.

The image processor 130 may generate a first image signal and a second image signal that indicate, respectively, the first user interface 210 and the second user interface 220 that are to be displayed on the screen 200 for manipulating the execution of the application. The first and second image signals that are generated by the image processor 130 may be transmitted to the display 110 and thus may be displayed as images including the first user interface 210 and the second user interface 230 on the screen 200 for manipulating the execution of the application. Also, the image processor 130 may process, based on user's manipulation input to the user input unit 120, image signals so as to newly compose a screen displayed on the display 110. The image processing and the layout of the screen that are performed by the image processor 130 according to the user's manipulation are described above with reference to FIGS. 4 through 9.

Regarding the display 110 and the image processor 130, descriptions that are the same as the aforementioned contents will be omitted here.

The user input unit 120 may receive, from a user, an input of user's manipulation with respect to a screen that is displayed on the display 110. The user input unit 120 may include at least one selected from a touch panel and a pen recognizing panel.

The touch panel may sense a touch input by a user and may output a value of a touch event that corresponds to a signal generated by the sensed touch input. When the touch panel is combined with a display panel and thus is formed as a touchscreen, the touchscreen may be configured as a capacitive touchscreen or a resistive touchscreen by using various types of touch sensors. The capacitive touchscreen may calculate touch coordinates by sensing a small amount of electricity generated when a body part of the user touches the surface of the capacitive touchscreen, which is coated with a dielectric material. The resistive touchscreen may include two embedded electrode plates and may calculate touch coordinates by sensing a flow of current that occurs when the user touches the resistive touchscreen and thus upper and lower plates of a touched point contact each other. The touch event that occurs on the touchscreen may be mainly generated by a finger of a person but may also be generated by an object formed of a conductive material capable of changing capacitance.

The pen recognizing panel may sense a proximate input or a touch input of a touch pen (e.g., a stylus pen or a digitizer pen) which occurs by a user, and may output a sensed proximate pen event or a sensed pen touch event. The pen recognizing panel may sense the touch input or the proximate input according to changes in a strength of an electromagnetic field, which occur when the touch pen approaches or touches the pen recognizing panel.

The memory 140 may store all pieces of data that are generated according to an operation of the image forming apparatus 100 and may store all programs that are used when the image forming apparatus 100 operates. For example, the memory 140 may store data such as data received from an external device, data input via the user input unit 120, faxed data, scanned data, and copied data that are generated according to the operation of the image forming apparatus 100, and may store various programs that are used in controlling the image forming apparatus 100. Also, the memory 140 may temporarily or semi-permanently store a part of content to be displayed on the screen of the display 110.

The memory 140 may include at least one selected from an internal memory (not shown) and an external memory (not shown). The internal memory may include at least one selected from a volatile memory (e.g., a dynamic random-access memory (DRAM), a static RAM (SRAM), a synchronous dynamic RAM (SDRAM), etc.), a non-volatile memory (e.g., a one time programmable read-only memory (OTPROM), a programmable ROM (PROM), an erasable and programmable ROM (EPROM), an electrically erasable and programmable ROM (EEPROM), a mask ROM, a flash ROM, etc.), a hard disk drive (HDD), and a solid-state drive (SSD). The external memory may include at least one selected from a compact flash (CF) memory, a secure digital (SD) memory, a micro secure digital (Micro-SD) memory, a mini secure digital (mini SD) memory, an extreme digital (xD) memory, and a memory stick.

The fax 150 transmits or receives fax data by using a modem. The fax 150 may convert image data, which is recorded to a document, into fax data to be adaptive for transmission using the modem, or may receive fax data from an external device and may deliver the fax data to the image forming unit 170 so as to control the image forming unit 170 to output the fax data to a printing medium such as a printing paper.

The scanner 160 may generate scanned data by scanning image data that is recorded to a document, and may deliver the scanned data to the communication unit 180 for an access to a network, to the memory 140 for storage, to the fax 150 for fax transmission, or to the image forming unit 170 for printing. That is, the scanner 160 may perform functions such as a scan to a server message block (scan to SMB) function, a scan to file transfer protocol (scan to FTP) function, a web distributed authoring and versioning (a SCAN TO WebDAV) function, a scan to e-mail function, a scan to personal computer (PC) function, or a scan to box function.

The image forming unit 170 forms an image and outputs copied and printed data to a printing medium such as a printing paper. The image forming unit 170 may include hardware units and a software module for driving the hardware units that perform charging, exposing, developing, transferring, and fixing operations so as to output the copied and printed data to the printing medium.

The communication unit 180 may include a network module for an access to a network according to an application and functions of the image forming apparatus 100, the modem for fax transmission and reception, and a universal serial bus (USB) host module for establishing a data transfer channel with a portable storage medium. The communication unit 180 may communicate with various external devices according to various communication schemes. The communication unit 180 may include at least one selected from a WiFi chip, a Bluetooth chip, a wireless communication chip, and a near field communication (NFC) chip. The controller 190 may control the communication unit 180 to communicate with the various external devices.

The WiFi chip and the Bluetooth chip may communicate with another device by using WiFi and Bluetooth, respectively. If the WiFi chip or the Bluetooth chip is used, the WiFi chip or the Bluetooth chip may first transmit and receive various types of connection information including a service set identification (SSID), a session key, or the like, may connection communication by using the connection information, and then may transmit and receive various types of information. The wireless communication chip indicates a chip that communicates with another device according to various communication standards such as the Institute of Electrical and Electronics Engineers (IEEE), ZigBee $3^{rd}$ generation (3G), 3rd Generation Partnership Project (3GPP), Long Term Evolution (LTE), or the like. The NFC chip indicates a chip that operates in an NFC way by using a 13.56 MHz band from among various radio frequency-identification (RF-ID) frequency bands such as 135 kHz, 13.56 MHz, 433 MHz, 860~960 MHz, 2.45 GHz, or the like.

The controller 190 may generally control functions of the image forming apparatus 100 and may be formed as a micro-processor. The controller 190 may be divided into a plurality of processor modules that are separated according to their functions, and a main processor module that collectively manages the plurality of processor modules. The controller 190 may control the display 110, the user input unit 120, and the image processor 130 to display a screen including a user interface so that a user may watch, and to process image signals according to an input of user's manipulation so that a screen corresponding thereto may be displayed. Also, the controller 190 may control various programs and data to be stored in the memory 140 or may control various programs and data stored in the memory 140 to be loaded from the memory 140. The controller 190 may control an operation of the fax 150 to transmit or receive a fax or may control an operation of the scanner 160 to scan a document. The controller 190 may control data loaded from the memory 140 to be compared with data processed by the controller 190, or may control data stored in the memory 140 to be delivered to the image forming unit 170. The controller 190 may control the communication unit 180 to receive data from an external device or to transmit data to the external device.

Names of the elements of the image forming apparatus 100 may be changed. The image forming apparatus 100 may be embodied with more or less elements than the aforementioned elements and may further include other elements.

Figure 11:
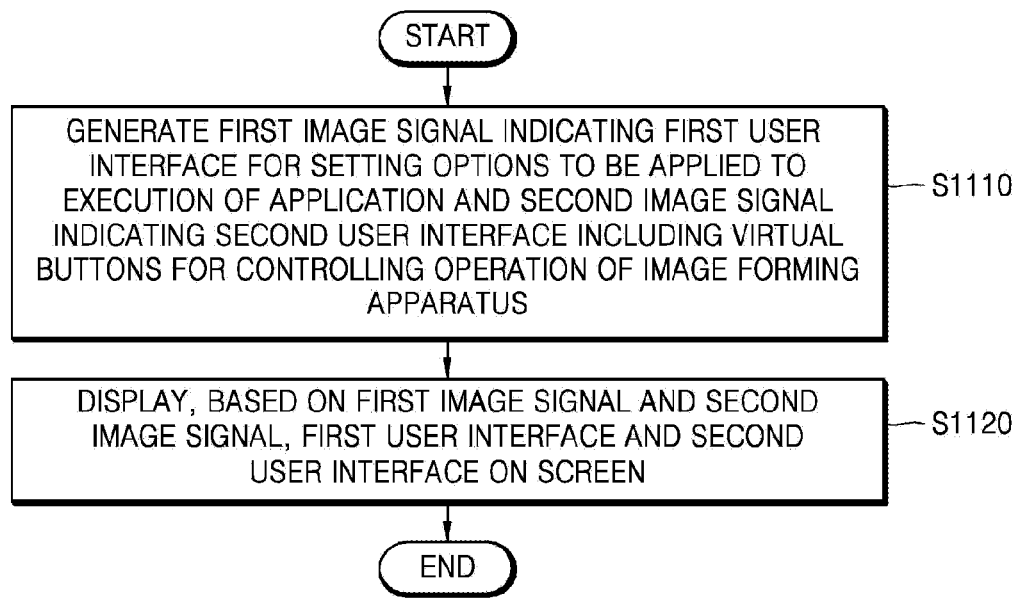
FIG. 11 is a flowchart of a method of providing the screen for manipulating execution of an application of the image forming apparatus, according to an exemplary embodiment.

FIG. 11 is a flowchart of a method of providing the screen 200 for manipulating execution of an application of the image forming apparatus 100, according to an exemplary embodiment. Although descriptions are omitted here, if the descriptions are described above, the descriptions may also be applied to the flowchart of FIG. 11.

In operation S1110, the image processor 130 of the image forming apparatus 100 may generate a first image signal that indicates the first user interface 210 for setting options to be applied to the execution of the application and may generate a second image signal that indicates the second user interface 220 including the virtual buttons 222 and 224 for controlling an operation of the image forming apparatus 100. The first user interface 210 and the second user interface 220 may be differently displayed according to application types.

The virtual button 222 may be one of a button for starting, stopping, and resetting the operation of the image forming apparatus 100. The second user interface 220 may include the virtual button 224 whose shape and function are changed according to types of the application. When the second user interface 220 includes the virtual buttons 222 and 224, the second user interface 220 may be separated based on each of the virtual buttons 222 and 224 and may be displayed.

In operation S1120, the display 110 of the image forming apparatus 100 may display, based on the first image signal and the second image signal, the first user interface 210 and the second user interface 220 on the screen 200 for manipulating the execution of the application. If the first user interface 210 and the second user interface 220 overlap each other on the screen 200 for manipulating the execution of the application, the display 110 may display the second user interface 220 over the first user interface 210. Here, a degree of a transparency of an entire area or a partial area of the second user interface 220 may be greater than a degree of a transparency of the first user interface 210. By doing so, a user may see information, which is displayed on an area of the first user interface 210 that is obstructed by the second user interface 220, via the second user interface 220 that is translucent. Also, the user may move the second user interface 220 to a random position on the first user interface 210.

If user's manipulation occurs with respect to the screen 200 for manipulating the execution of the application that is displayed on the display 110 of the image forming apparatus 100, the user's manipulation is input by using the user input unit 120. Based on the input user's manipulation, the image processor 130 may newly compose the screen 200 for manipulating the execution of the application that is to be displayed on the display 110.

For one example, in a case where the second user interface 220 that is placed over the first user interface 210 is displayed on the screen 200 for manipulating the execution of the application, if user's manipulation with respect to the first user interface 210 is input, the image forming apparatus 100 may control the second user interface 220 to disappear from the screen 200 during a predetermined time, and if the user's manipulation is not input during the predetermined time, the image forming apparatus 100 may control the second user interface 220 to be displayed again. For another example, in a case where the second user interface 220 that is placed over the first user interface 210 is displayed on the screen 200 for manipulating the execution of the application, if user's manipulation with respect to the first user interface 210 is input, the image forming apparatus 100 may control the second user interface 220 to be displayed as a substitution icon on an area of the screen 200 for manipulating the execution of the application, and if the user's manipulation with respect to the substitution icon is input, the image forming apparatus 100 may control the second user interface 220 to be displayed again.

As described above, according to the one or more of the above exemplary embodiments, the image forming apparatus may be controlled in a manner that physical buttons are displayed as virtual buttons by using software, whereby usability of the image forming apparatus may be improved.

The method of providing the screen for manipulating the execution of the application can be written as computer programs and can be implemented in general-use digital computers that execute the programs using a non-transitory computer readable recording medium. Examples of the computer readable recording medium include magnetic storage media (e.g., ROM, floppy disks, hard disks, etc.), optical recording media (e.g., CD-ROMs, or DVDs), etc.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the image forming apparatus described herein.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of providing a screen for manipulating execution of an application of an image forming apparatus, the method comprising:

generating a first image signal indicating a first user interface for setting options to be applied to the execution of the application, and a second image signal indicating a second user interface comprising at least a first virtual button for controlling an operation of the image forming apparatus and a second virtual button for controlling another operation of the image forming apparatus, wherein at least one of a function and an appearance of the first virtual button is maintained identical regardless of the application whose options are set by the first user interface while at least one of a function and an appearance of the second virtual button is changed according to the application whose options are set by the first user interface;

receiving a setting of a disappearance adjustment configuration for the second user interface; and displaying, based on the first image signal and the second image signal, the first user interface and the second user interface on the screen, wherein the displaying of the second user interface is at least partly based on the disappearance adjustment configuration, wherein the setting of a disappearance adjustment configuration includes a predetermined time, set by a user, in which the second user interface becomes transparent and then completely disappears during the predetermined time.

2. The method of claim 1, wherein, if the first user interface and the second user interface overlap each other on the screen, the displaying comprises displaying the second user interface on the first user interface.

3. The method of claim 2, wherein a degree of transparency of an entire area or a partial area of the second user interface is greater than a degree of transparency of the first user interface so that a portion of an area of the first user interface that is overlapped by the second user interface, is visible by the difference between the degrees of transparencies of the first user interface and the second user interface.

4. The method of claim 2, wherein, if a manipulation by the user with respect to the first user interface is input, the second user interface disappears from the screen, and if the manipulation by the user with respect to the first user interface ends, the second user interface is displayed again on the screen.

5. The method of claim 2, wherein, if a manipulation by the user with respect to the first user interface is input, the second user interface is displayed as a substitution icon on an area of the screen, and if a manipulation by the user with respect to the substitution icon is input, the second user interface is displayed again on the screen.

6. The method of claim 2, wherein the second user interface can be moved to a random position on the first user interface.

7. The method of claim 1, further comprising, when a manipulation by the user with respect to the second user interface occurs, displaying positions to where the second user interface can be moved on the screen; and moving the second user interface to a position selected by the user from among the positions and displaying the second user interface at the position selected by the user.

8. The method of claim 1, wherein, the second user interface is displayed on one portion of the screen and overlaps at least a portion of the first user interface such that the at least the portion of the first user interface overlapped by the second user interface is incapable of receiving an input from the user.

9. The method of claim 1, wherein the first user interface and the second user interface are differently displayed according to types of the application.

10. The method of claim 1,
wherein the first virtual button is one of a button for starting, stopping, and resetting the operation of the image forming apparatus.

11. A non-transitory computer-readable recording medium having recorded thereon a program for executing the method of claim 1, by using a computer.

12. An image forming apparatus that provides a screen for manipulating execution of an application, the image forming apparatus comprising:
an image forming unit;
an image processor for
generating a first image signal indicating a first user interface for setting options to be applied to the execution of the application, generating a second image signal indicating a second user interface comprising at least a first virtual button for controlling an operation of the image forming apparatus and a second virtual button for controlling another operation of the image forming apparatus, and receiving a setting of a disappearance adjustment configuration for the second user interface, wherein at least one of a function and an appearance of the first virtual button is maintained identical regardless of the application whose options are set by the first user interface while at least one of a function and an appearance of the second virtual button is changed according to the application whose options are set by the first user interface; and
a display for displaying, based on the first image signal and the second image signal, the first user interface and the second user interface on the screen, wherein the displaying of the second user interface is further based on the setting of the disappearance adjustment configuration.
wherein the setting of a disappearance adjustment configuration includes a predetermined time, set by a user, in which the second user interface becomes transparent and then completely disappears during the predetermined time.

13. The image forming apparatus of claim 12, wherein, if the first user interface and the second user interface overlap each other on the screen, the display displays the second user interface on the first user interface.

14. The image forming apparatus of claim 13, wherein a degree of transparency of an entire area or a partial area of the second user interface is greater than a degree of transparency of the first user interface so that a portion of an area of the first user interface that is overlapped by the second user interface, is visible by the difference between the degrees of transparencies of the first user interface and the second user interface.

15. The image forming apparatus of claim 13, wherein, if a manipulation by the user with respect to the first user interface is input, the second user interface disappears from the screen, and if the manipulation by the user, with respect to the first user interface, ends, the second user interface is displayed again on the screen.

16. The image forming apparatus of claim 13, wherein, if a manipulation by the user with respect to the first user interface is input, the second user interface is displayed as a substitution icon on an area of the screen, and if a manipulation by the user with respect to the substitution icon is input, the second user interface is displayed again on the screen.

17. The image forming apparatus of claim 13, wherein the second user interface can be moved to a random position on the first user interface.

18. The image forming apparatus of claim 12, wherein, when a manipulation by the user with respect to the second user interface occurs, the display displays positions to where the second user interface can be moved on the screen, moves the second user interface to a position selected by the user from among the positions, and displays the second user interface at the position selected by the user.

19. The image forming apparatus of claim 12, wherein the second user interface disappears the predetermined time after an input of a manipulation by the user to the first user interface so that a portion of the first user interface, which was overlapped with the second user interface before the predetermined time elapsed, is accessible and is in a usable state for manipulation by the user.

20. The image forming apparatus of claim 12, wherein when the application that is executed is a copy application, the first user interface includes at least one virtual button for setting options to be applied for copying a document, the options to be set including at least one of a number of copies to be made, a paper source, a color mode, image attribute adjustment settings, and reduction/enlargement settings, and the first virtual button of the second user interface corresponding to the copy application controls the image forming apparatus to perform one of a reset operation, a start operation, and a stop operation.

21. The image forming apparatus of claim 20, wherein when the application is changed from executing the copy application to executing another application, the first user interface changes such that at least one other virtual button for setting options to be applied with respect to the another application is displayed, and the function of the second virtual button of the second user interface is changed so that the second virtual button of the second user interface corresponds to the another application and controls the image forming apparatus to perform the function.

22. An image forming apparatus that provides a screen for manipulating execution of an application, the image forming apparatus comprising:
an image forming unit; and
an image processor to generate a first user interface for setting options to be applied to the execution of the application and a second user interface comprising first and second virtual buttons for controlling an operation of the image forming apparatus, and to receive a setting of a disappearance adjustment configuration for the second user interface, wherein at least one of a function and an appearance of the first virtual button is left identical regardless of the application whose options are set by the first user interface while at least one of a function and an appearance of the second virtual button is changed according to the application whose options are set by the first user interface; and a display to display the first user interface and the second user interface on the screen, wherein the displaying of the second user interface is at least partly based on the disappearance adjustment configuration, wherein the setting of a disappearance adjustment configuration including a predetermined time, set by a user, in which the second user interface becomes transparent and then completely disappears during the predetermined time.

23. The image forming apparatus of claim 22, wherein both the function and the appearance of the first virtual button remain identical regardless of the application being executed by the image forming apparatus.

24. The image forming apparatus of claim 22, wherein when a new application is selected, the first user interface is configured to set the options to be applied to the execution of the newly selected application and wherein both the function and the appearance of the second virtual button are changed to correspond to the newly selected application.

25. The image forming apparatus of claim 22, wherein when a new application is selected, the first user interface is configured to set the options to be applied to the execution of the newly selected application, and wherein both the function and the appearance of the second virtual button are changed to correspond to the newly selected application while the function and the appearance of the first virtual button is left unchanged.

* * * * *

UNITED STATES PATENT AND TRADEMARK OFFICE
CERTIFICATE OF CORRECTION

PATENT NO. : 9,696,952 B2  Page 1 of 1
APPLICATION NO. : 14/644592
DATED : July 4, 2017
INVENTOR(S) : Kwang-soo Ha et al.

It is certified that error appears in the above-identified patent and that said Letters Patent is hereby corrected as shown below:

In the Claims

Column 15, Lines 53-54:
In Claim 12, delete "configuration." and insert -- configuration, --, therefore.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*